(No Model.)
M. N. SEVIER.
TROUSERS.
No. 373,313. Patented Nov. 15, 1887.
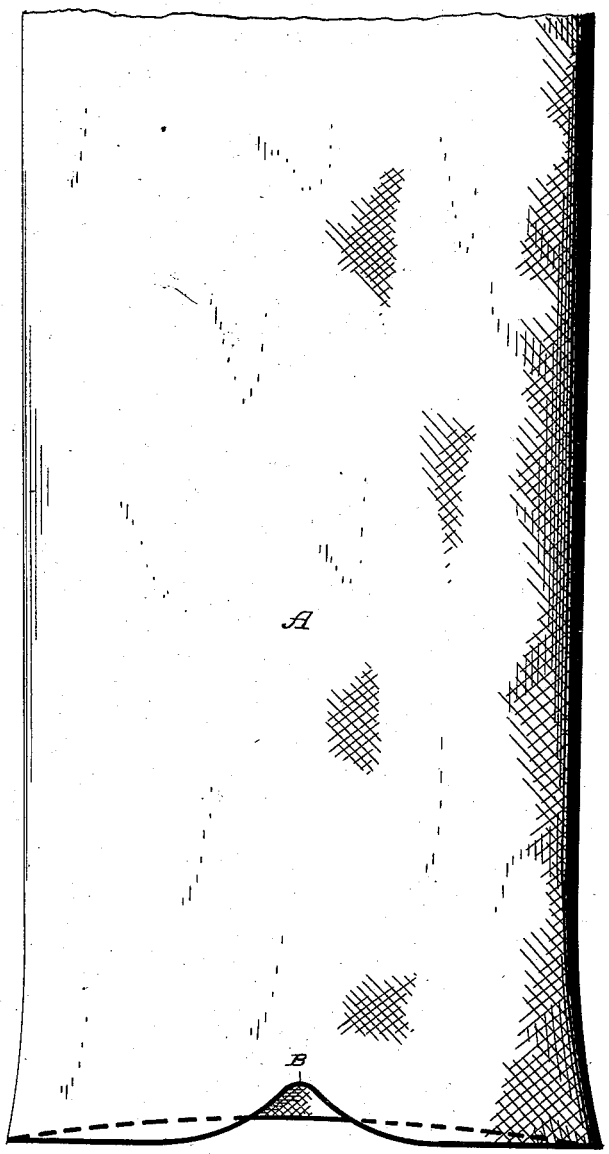

UNITED STATES PATENT OFFICE.

MOSES NIMROD SEVIER, OF VERNON, TEXAS.

TROUSERS.

SPECIFICATION forming part of Letters Patent No. 373,313, dated November 15, 1887.

Application filed September 9, 1887. Serial No. 249,225. (No model.)

*To all whom it may concern:*

Be it known that I, MOSES NIMROD SEVIER, of Vernon, in the county of Wilbarger and State of Texas, have invented certain new and useful Improvements in Pants; and I do hereby declare the following to be a full, clear, and exact description of the invention, such as will enable others skilled in the art to which it pertains to make and use it, reference being had to the accompanying drawing, which forms part of this specification.

My invention relates to an improvement in pants; and it consists in a pants-leg having a recess or notch cut in its lower rear edge, so as to prevent it from coming in contact with the ground, as will be more fully described hereinafter.

The object of my invention is to prevent pants-legs from wearing away at the lower rear edge by coming in contact with the ground, as is now the case, and this I accomplish by cutting a recess or notch in the lower rear edge of the leg at that point where the goods come in contact with the ground.

The accompanying drawing is a rear view of a pants-leg embodying my invention.

Pants-legs cut in the usual manner have their lower edges cut downward at an angle from that point which rests upon the instep of the foot. This method of cutting makes the rear edge of the bottom of the pants much lower than the front edge and brings the rear edge in contact with the ground. The lower rear edge of the leg coming in contact with the ground at every step, and often being caught between the heel of the shoe and the ground, soon becomes cut and worn away, which seriously disfigures the pants, and is a very great annoyance to the wearer. For the purpose of overcoming this defect I cut in the lower rear edge of the pants-leg A a recess or notch, B, which prevents the lower rear edge of the pants-leg from scraping upon the ground and wearing out, as is now the case. The leg A is formed in the ordinary manner, with the exception of the recess B, which is cut in its rear lower edge at that point where it usually touches or scrapes upon the ground, and thus this great objection and annoyance are done away with in a cheap and effectual manner.

I do not limit myself to the exact form or shape of notch or recess here shown, as it is obvious that the lower edge of the pants-leg may be cut away in any manner desired to accomplish the object herein described without departing from the spirit of my invention.

Having thus described my invention, I claim—

As a new article of manufacture, a pair of pants having a recess, B, formed in the lower rear edge of each of its legs, substantially as shown.

In testimony whereof I affix my signature in presence of two witnesses.

MOSES NIMROD SEVIER.

Witnesses:
R. P. ELLIOTT,
R. T. SITTERLEY.